United States Patent
Sato et al.

(10) Patent No.: US 7,054,238 B2
(45) Date of Patent: May 30, 2006

(54) SIGNAL SHAPING CIRCUIT

(75) Inventors: Jun Sato, Kanagawa (JP); Akiya Saito, Kanagawa (JP); Toru Aida, Kanagawa (JP); Yoshinobu Usui, Kanagawa (JP)

(73) Assignee: Sony Corporation ( * ) Notice: Subject to any disclaimer, the term of this patent is extended or adjusted under 35 U.S.C. 154(b) by 693 days.

(21) Appl. No.: 10/240,097

(22) PCT Filed: Jan. 29, 2002

(86) PCT No.: PCT/JP02/00627

§ 371 (c)(1),
(2), (4) Date: Dec. 10, 2002

(87) PCT Pub. No.: WO02/061740

PCT Pub. Date: Aug. 8, 2002

(65) Prior Publication Data

US 2004/0008598 A1    Jan. 15, 2004

(30) Foreign Application Priority Data

Jan. 29, 2001    (JP)    ............................. 2001-19409

(51) Int. Cl.
G11B 7/00    (2006.01)

(52) U.S. Cl. ................. 369/44.25; 369/124.15

(58) Field of Classification Search ............. 369/44.23, 369/44.25, 44.32, 124.15
See application file for complete search history.

(56) References Cited

U.S. PATENT DOCUMENTS 6,185,172 B1 *   2/2001   Nakazawa    ............... 369/47.46

FOREIGN PATENT DOCUMENTS

| EP | 820053    | 1/1998  |
|----|-----------|---------|
| JP | 5-266482  | 10/1993 |
| JP | 7-272278  | 10/1995 |
| JP | 9-312021  | 12/1997 |
| JP | 10-31825  | 2/1998  |

* cited by examiner

*Primary Examiner*—Nabil Hindi
(74) *Attorney, Agent, or Firm*—Rader, Fishman Grauer PLLC; Ronald P. Kananen

(57) ABSTRACT

The present invention relates to a signal shaping circuit which is capable of shaping a returning light signal of a modulated signal whose signal level and signal length are arbitrarily varied such that it can be demodulated. The shaped signal pattern generation circuit 15 has, in advance, variation pattern information with regard to a predetermined variation pattern to be applied on a returning light signal recorded therein. The counter 13 inputs a returning light signal, counts a signal length thereof and sends a count value to the shaped signal pattern generation circuit 15. An A/D conversion 14 detects a signal level of the returning light signal and sends the detected signal level to the shaped signal pattern generation circuit 15 in a similar way. The shaped signal pattern generation circuit 15 refers to the variation pattern information and calculates an optimum signal pattern corresponding to a signal length and a signal level of the inputted, returning light signal. The calculated shaped signal pattern is outputted to a shaped signal generation circuit 16. Based on the signal pattern, the shaped signal generation circuit 16 converts the returning light signal and generates an optimum shaped signal.

6 Claims, 4 Drawing Sheets

USUAL EFM 3T SIGNAL

USUAL EFM 3T PIT

HIGH-POWER EFM 3T SIGNAL

HIGH-POWER EFM 3T PIT

LOW-POWER EFM 3T SIGNAL

LOW-POWER EFM 3T PIT

SIGNAL SHAPING CIRCUIT

TECHNICAL FIELD

The present invention relates to a signal shaping circuit, in particular, to a signal shaping circuit which receives a returning light signal corresponding to a varied modulated signal obtained by varying a modulated signal to be recorded on an optical disc with a predetermined variation pattern and shapes the returning light signal.

BACKGROUND ART

Generally, with regard to optical disks, such as CD (Compact Disk), MD (Mini Disk), DVD (Digital Versatile Disk) and the like, in a case of producing a master disc of an optical disc, a modulated signal obtained by performing error correction and modulation onto predetermined information data is generated, radiation of a laser beam is controlled in accordance with the obtained modulated signal, and cutting of the master optical disc is carried out. In this way, in accordance with the modulated signal are formed on the master optical disc. With regard to replica optical discs formed in accordance with the master optical disc, the same pits as those on the master optical disc are formed. An optical disk reproducing apparatus irradiates a laser beam onto this optical disc and receives a returning light. Then, the apparatus obtains a reproducing signal whose signal level is variable in accordance with the quantity of the returning light. The apparatus then demodulates the reproducing signal and reproduces information data. In addition, there is a master optical disc producing system which uses a cutting signal inspection apparatus that inspects the cutting of the disc by receiving a returning light signal in order to confirm proper production of the master optical disc.

Now, the returning light signal will be described while taking a master disc producing system in which the optical disc is a CD as an example. FIG. 6 is a view showing a configuration of a master optical disc producing system and a cutting signal inspection apparatus.

Information data, which is recorded on an optical disc master 200, is read out by a reader unit 310 of an EFM (Eight to Fourteen Modulation) signal transmitter 300 and is transferred to a signal processing unit 320. The signal processing unit 320 carries out a necessary signal processing on the information data read out by the reader unit 310, and sends a modulated signal to an EFM output unit 330. The EFM output unit 330 outputs a modulated signal to a laser beam recorder 400 as an EFM signal based on a channel clock. The laser beam recorder 400 irradiates a laser beam onto a master optical disc 410 in accordance with the EFM signal to perform the cutting the optical disc so as to produce the master optical disc. In order to check whether or not the master optical disc is properly produced, a cutting signal inspection apparatus 500 acquires and demodulates a returning light signal from the master optical disc 410 which is being cut, and the cutting signal inspection apparatus 500 carries out a format inspection or verification on the demodulated signal. It is noted that the returning light signal becomes a signal the same as the EFM signal which is a modulated signal.

However, in the conventional cutting signal inspection device or in the conventional optical disc reproducing apparatus, there is a problem that the returning light signal cannot be correctly demodulated in a case where the modulated signal is arbitrarily changed.

An example of a cutting signal inspection apparatus will now be explained. Conventionally, the EFM signal transmitter 300 does not change an EFM signal in particular, and thus, the cutting signal inspection apparatus 500 can demodulate an input signal without any adjustment. However, in recent years, optical discs such as those making a contrast on a signal surface of the disc to have a picture or a symbol on a surface thereof or those having a level and a length of the EFM modulated signal arbitrarily varied for copy protection have been provided. For example, a recording method for recording visibly recognizable letters and figures on an optical disc by controlling formation of pits is suggested in Japanese Patent Application Laid-Open Hei 9-312021. In addition, as suggested in Japanese Patent Application Laid-Open Hei 10-31825, there is a master optical disc producing system in which a timing of a modulated signal is corrected according to a pattern of the modulated signal in order to reduce reproduction error during reproducing an optical disc.

In this way, when the cutting signal inspection apparatus 500 receives a returning light signal from a master optical disc cut by a varied modulated signal the level and the length of which has been arbitrarily varied, since the cutting signal inspection apparatus 500 cannot correctly deal with the varied modulated signal, there occurs demodulation error or demodulation failure at the time of demodulation.

DISCLOSURE OF INVENTION

The present invention is made in view of the above-mentioned points. Accordingly, the present invention provides a signal shaping circuit and a signal shaping method for shaping a returning light signal of a varied modulated signal the level and the length of which has been arbitrarily varied so that the returning light signal can be demodulated.

In the present invention, in order to solve the above-mentioned problems, there is provided a signal shaping circuit which receives an input of a returning light signal from an optical disc or a master optical disc on which a varied modulated signal obtained by varying a modulated signal with a predetermined variation pattern is recorded, converts the returning light signal, and generates a shaped signal, wherein the signal shaping circuit is characterized by comprising: signal length measurement means which measures a signal length of the returning light signal; signal level measurement means which measures a signal level of the returning light signal; shaped signal pattern generation means in which variation pattern information with regard to a predetermined variation pattern is stored therein in advance, and which calculates and generates a shaped signal pattern from values of the signal length measured by the signal length measurement means and the signal level measured by the signal level measurement means and the variation pattern information; and shaped signal generation means which converts the returning light signal based on the shaped signal pattern generated by the shaped signal pattern generation means and generates the shaped signal.

In a signal shaping circuit having such a configuration, the variation pattern information concerning the predetermined variation pattern which is to be applied to the modulated signal to be recorded on the optical disc or the master optical disc is recorded in the shaped signal pattern generation means, in advance. The signal length measurement means receives the returning light signal from the optical disc or the master optical disc, measures a time interval between a signal level change of the returning light signal and a next level change as the signal length, and sends it to the shaped signal pattern generation means. The signal level detection means measures a signal level of the returning light signal and sends it to the shaped signal pattern generation means, in the similar way. The shaped signal pattern generation means predicts the variation value of the varied modulated signal corresponding to the received signal length and signal level of the returning light signal in accordance with the recorded variation pattern information so as to calculates and calculates an optimum shaped signal pattern. The calculated shaped signal pattern is output to the shaped signal generation means. Based on the shaped signal pattern, the shaped signal generation means converts the returning light signal and generates an optimum shaped signal.

It is desirable for the signal shaping circuit of the present invention to further have variation history recording means to record a history of variation of the signal length and the signal level.

It is desirable that the shaped signal pattern generation means stores therein, as variation pattern information, compensation information of the modulated signal corrected in accordance with the variation pattern of the modulated signal in order to reduce reproduction error during reproducing the optical disc.

In a case where there are formed a region of high reflection rate and a region of low reflection rate on an information recording surface in accordance with difference in width of pits formed on the information recording surface so that a visibly recognizable desired image is recorded on the information recording surface, it is desirable that the shaped signal pattern generation means records therein, as the variation pattern information, correction information of the signal level and the signal length required for recording the desired image.

In addition, in order to solve the above-mentioned problem, there is provided a signal shaping method for generating a shaped signal by receiving an input of a returning light signal from an optical disc or a master optical disc on which a varied modulated signal obtained by varying a modulated signal with a predetermined variation pattern is recorded and converting the returning light signal, wherein the signal shaping method is characterized by comprising: a recording step for recording, in advance, variation pattern information with regard to the predetermined variation pattern; a signal length measurement step for measuring a time interval between a signal level change and a next signal level change of the inputted returning light signal; a signal level measurement step for measuring a signal level of the returning light signal; a calculation step for calculating a shaped signal pattern corresponding to the signal length measured in a process of signal length measuring step and the signal level measured in a process of the signal level measuring step based on variation pattern information recorded in advance in a process of the recording; and a generation step for generating a shaped signal by converting the returning light signal in accordance with the shaped signal pattern calculated in a process of the calculation step.

In a signal shaping method of such procedure, the variation pattern information with regard to the predetermined variation pattern to be applied to the modulated signal to be recorded on the optical disc is recorded, in advance. The returning light signal corresponding to the varied modulated signal obtained by varying the modulated signal with the predetermined variation pattern is inputted, and the signal level of the returning light signal and the signal length being a time interval between a signal level change of the returning light signal and a next level change is measured. Next, in accordance with the recorded variation pattern information, the variation value of the detected signal length and signal level of the returning light signal is predicted and the optimum shaped signal pattern is calculated. Successively, based on the calculated shaped signal pattern, the returning light signal is converted to generate the shaped signal.

BEST MODE FOR CARRYING OUT THE INVENTION

Now, embodiments of the present invention will be described with reference to the drawings. Embodiments described below are preferable specific example of the present invention and various limitations technically preferable are applied to those example. However, the scope of the present invention is not limited to these embodiments.

Figure 1:
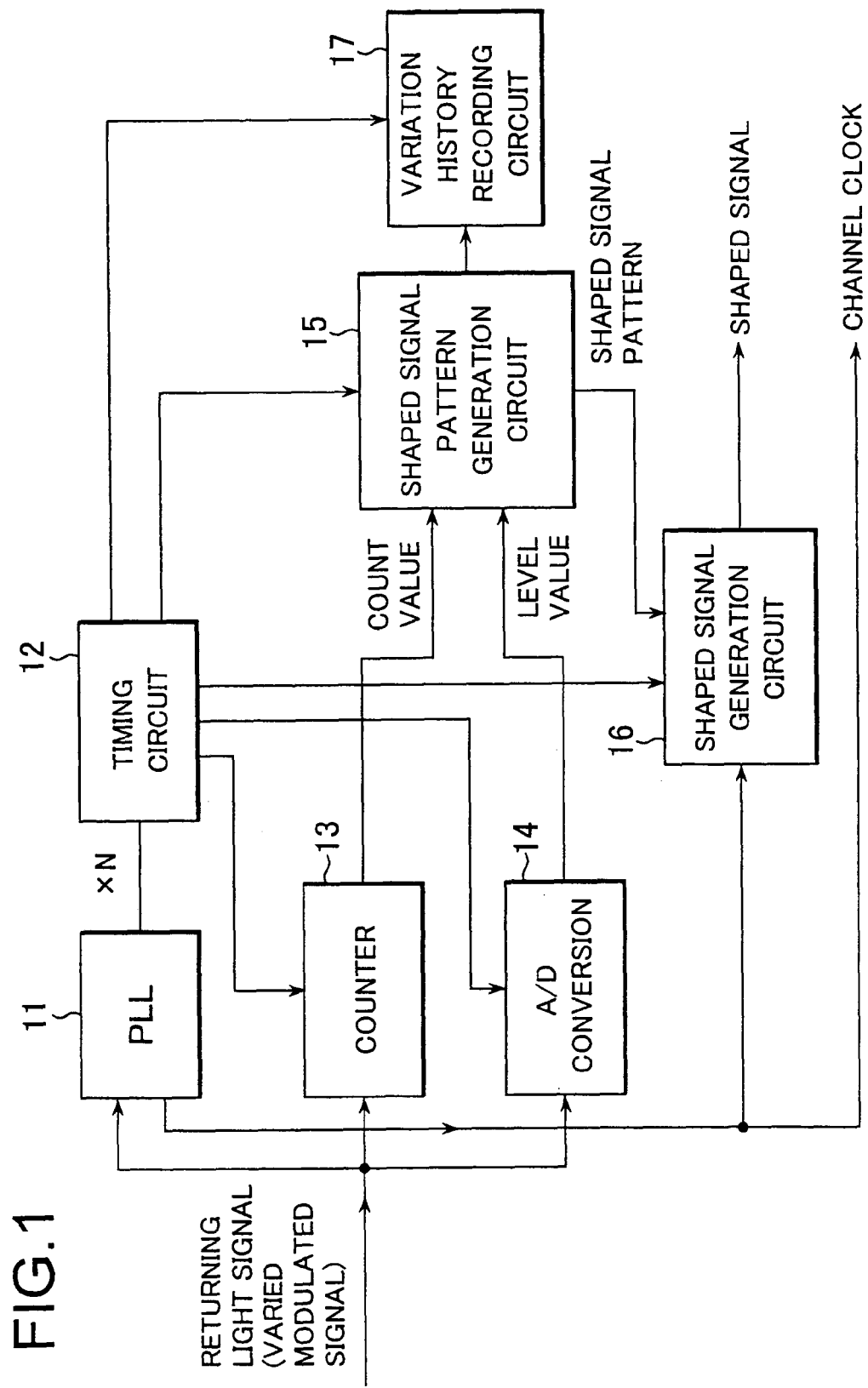
FIG. 1 is a structural view showing a configuration of a signal shaping circuit which is an embodiment of the present invention.

FIG. 1 is a structural view showing a configuration of a signal shaping circuit which is an embodiment of the present invention. A signal shaping circuit according to the present invention comprises a PLL (Phase Locked Loop) 11 which reproduces a clock; a timing circuit 12 which generates a various timing signal in a circuit; a counter 13 which is signal length calculation means which calculate a signal length of a returning light signal; an A/D conversion 14 which is signal level detection means which detects a signal level of the returning light signal; a shaped signal pattern generation circuit 15 being shaped signal pattern generation means, in which variation pattern information is recorded in advance, and which predicts a variation value of the returning light signal from a count value that is a signal length of an inputted returning light signal and a signal level value using the variation pattern information, calculates an optimum shaped signal pattern and output it to a shaped signal generation circuit 16; the shaped signal generation circuit 16 being shaped signal generation means which generates a shaped signal capable of being demodulated; and a variation history recording circuit 17 which is variation history recording means for recording the history of detected variation.

The signal shaping circuit is, for example, in a master optical disc producing system which producing a master optical disc, the one which receives an input of the returning light signal from a master optical disc that was cut by a laser beam recorder, and carries out a signal shaping process so as to enable a cutting signal inspection apparatus which performs cutting inspection to carry out a demodulation process, or the one which receives an input of a returning light signal being a reproducing signal from an optical disc, and carries out a signal shaping process so as to enable a optical disc reproducing apparatus to carry out a demodulation process.

The PLL 11 reproduces a clock from the inputted returning light signal, and oscillates a channel clock and a clock of N times (N being an arbitrary integer) thereof. The channel clock is supplied to the shaping signal generating circuit 16, as well as being externally outputted. The clock of N times of the channel clock is supplied to the timing circuit 12.

The timing circuit 12 generates a timing signal which is necessary in each part of the signal shaping circuit in accordance with the clock of N times of the channel clock inputted from the PLL 11. The counter 13 receives the clock of N times of the channel clock signal from the timing circuit 12 as a timing signal and counts a length of the time interval between a signal level change and a next signal level change of the returning light signal as a signal length. The counted value is outputted to the shaping signal pattern generating circuit 15. Since the returning light signal can be consider to be the same as a varied modulated signal obtained by varying a modulated signal with a predetermined variation pattern, the counter 13 measures the signal length of the varied modified signal.

The A/D conversion 14 receives the clock of N times of the channel clock from the timing circuit 12 as a timing signal, samples a change of the signal level of the returning light signal, and outputs the calculated level value to the shaped signal pattern generating circuit 15. Since the returning light signal can be considered to be the same as the varied modulated signal obtained by varying the modulated signal with the predetermined variation pattern, the A/D conversion 14 measures the signal level of the varied modified signal.

The shaped signal pattern generating circuit 15 has recorded therein, in advance, variation pattern information about the predetermined variation pattern to be applied to the modulated signal to be recorded in the master optical disc. The variation pattern information is correction information of the signal level and the signal length which is required for recording the images, in a case, for example, where the optical disc is an optical disc on which desired images such as pictures and symbols are recorded by controlling width of pits on an information recording surface. In addition, in a case of an optical disc on which recording compensation is applied in accordance with a variation pattern which is obtained by sampling the modulated signal for preventing the production side being affected by the interference between pits in order to reduce reproduction error at the time of reproducing the optical disc, compensation information thereof is recorded as the variation pattern information. The variation pattern information has, for example, a signal pattern of a modulated signal before variation and variation quantity of signal length and signal level after variation as table information recorded therein. The variation pattern information to be recorded can be changed if necessary so that an input signal having an arbitrary variation pattern can be processed. The shaped signal pattern generation circuit 15 predicts a variation value of the returning light signal from a count value which is the signal length of the inputted returning light signal and a level value being the signal level, using the variation pattern information, and calculates an optimum shaped signal pattern to output it to the shaped signal generation circuit 16. In addition, the shaped signal pattern generation circuit 15 transfers the count value and the level value of the inputted returning light signal to the variation history recording circuit 17, at necessary.

The shaped signal generation circuit 16 carries out shaping of the returning light signal in accordance with the shaped signal pattern outputted from the shaped signal pattern generation circuit 15 so as to output a shaped signal capable of being demodulated to the cutting signal inspection apparatus or the optical disc reproducing apparatus.

The variation history recording circuit 17 sequentially records the count values and the level values of the returning light signal inputted through the shaped signal pattern generation circuit 15 and generates a variation history. Using the count values and the level values recorded in the variation history, it is possible to analyze the duration, the period and the variation value of the signal variation.

Now, operation of the signal shaping circuit having such configuration and the signal shaping method thereof will be explained. The signal shaping circuit according to the present invention receives the input of the returning light signal corresponding to the varied modulated signal obtained by varying the modulated signal to be recorded on the optical disc with a predetermined variation pattern and shapes the returning light signal. The varied modulated signal is a signal obtained by varying a modulated signal generated by applying modulation, such as EFM modulation, to information data recorded on the optical disc, in accordance with a predetermined variation pattern. For example, the modulated signal is varied for recording a predetermined image on a recording surface of the optical disc or for reducing reproduction error in the reproducing apparatus.

Figure 2:
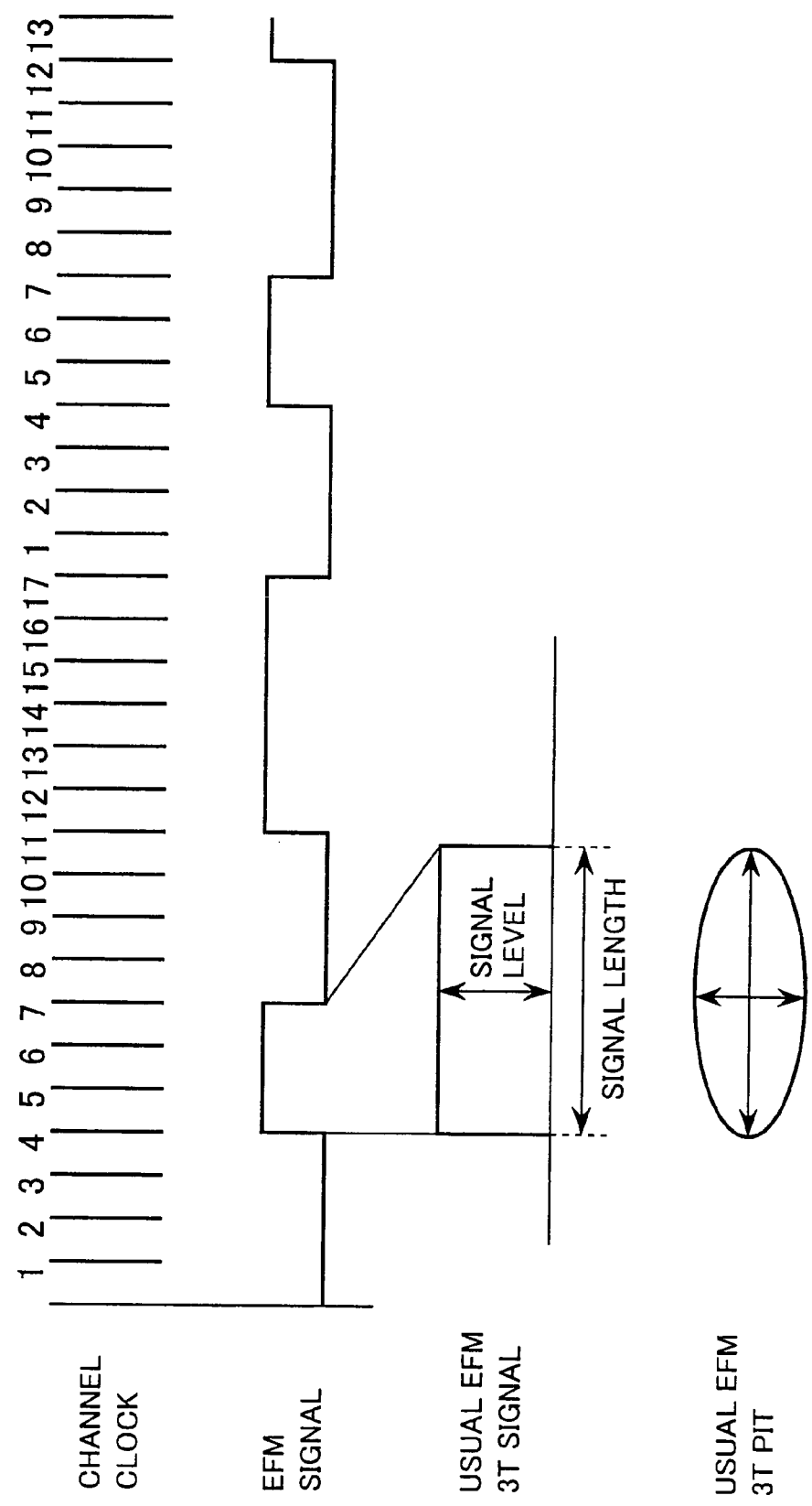
FIG. 2 is an example of a varied modulated signal inputted into the signal shaping circuit which is an embodiment of the present invention.

A case where a visibly recognizable image is recorded on an information recording surface of the optical disc by creating contrast thereon will be explained as an example. Here, the EFM signal processing used for recording information on a CD will be described. FIG. 2 shows an example of the varied modulated signal inputted into the signal shaping circuit which is an embodiment of the present invention.

A channel clock is a clock signal that becomes a reference of the modulated signal. An EFM signal changes a signal level to be 1/0 with reference to the channel clock. The minimum signal of the EFM signal is a signal equal to three channel clocks (hereinafter, referred to as "3T signal"), and a usual EFM 3T signal is the one that the first appeared 3T signal is enlarged in the figure. Hereinafter, a channel clock number (count value) between a signal level change and the next signal level change with reference to the channel clock is referred to as the signal length. In addition, the level shows magnitude of change of the EFM signal. In the master optical disc producing apparatus, a Laser Beam Recorder (Leaser Beam Recorder, hereinafter, referred to as LBR) irradiates a laser beam onto an information recording surface of an optical disc in accordance with the EFM signal so as to form pits thereon. The output power of the LBR corresponds to a level of an EFM signal. Accordingly, by controlling the level of the EFM signal so that the power of the LBR is changed, width of pits formed by the LBR is varied. Furthermore, the signal length corresponds to irradiation duration of a laser beam. The signal length of the EFM signal is corrected and the pit length is adjusted.

On the information recording surface of the optical disc, there are formed regions of a high reflection rate and regions of a low reflection rate due to difference in pit width of pits formed on the information recording surface of the optical disc. By utilizing such difference in reflection rate of pits on the information recording surface, images and symbols are formed thereon like a watermark.

Generally, when the pit width is changed, the length of a signal reproduced by a reproducing apparatus, such as a player, is also affected by the pit width. Accordingly, the signal length of the EFM signal is compensated so as not to be affected by the pit width. Thus, the optical disc having an image recorded thereon with contrast can be correctly reproduced by the player.

Figure 3:
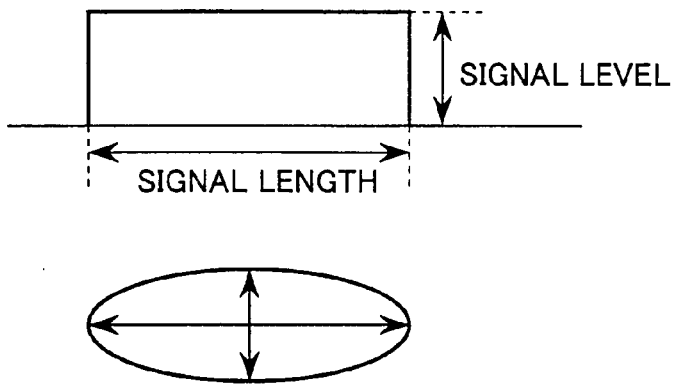
FIG. 3 is an example of a usual EFM signal and a pit to be formed.
Figure 4:
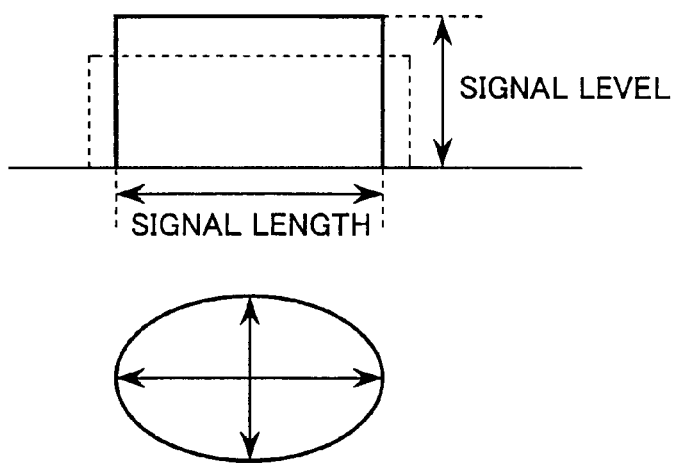
FIG. 4 is an example of a high-power EFM signal and a pit to be formed.
Figure 5:
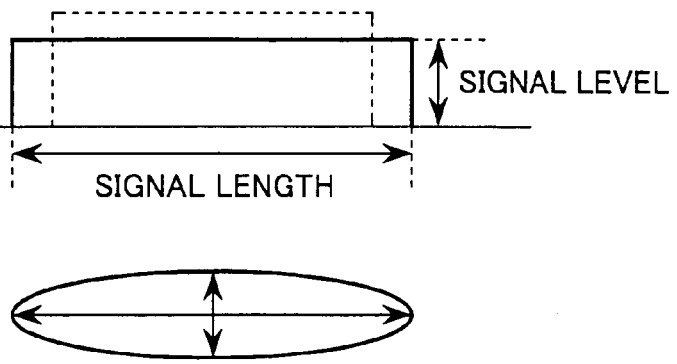
FIG. 5 is an example of a low-power EFM signal and a pit to be formed.
Figure 6:
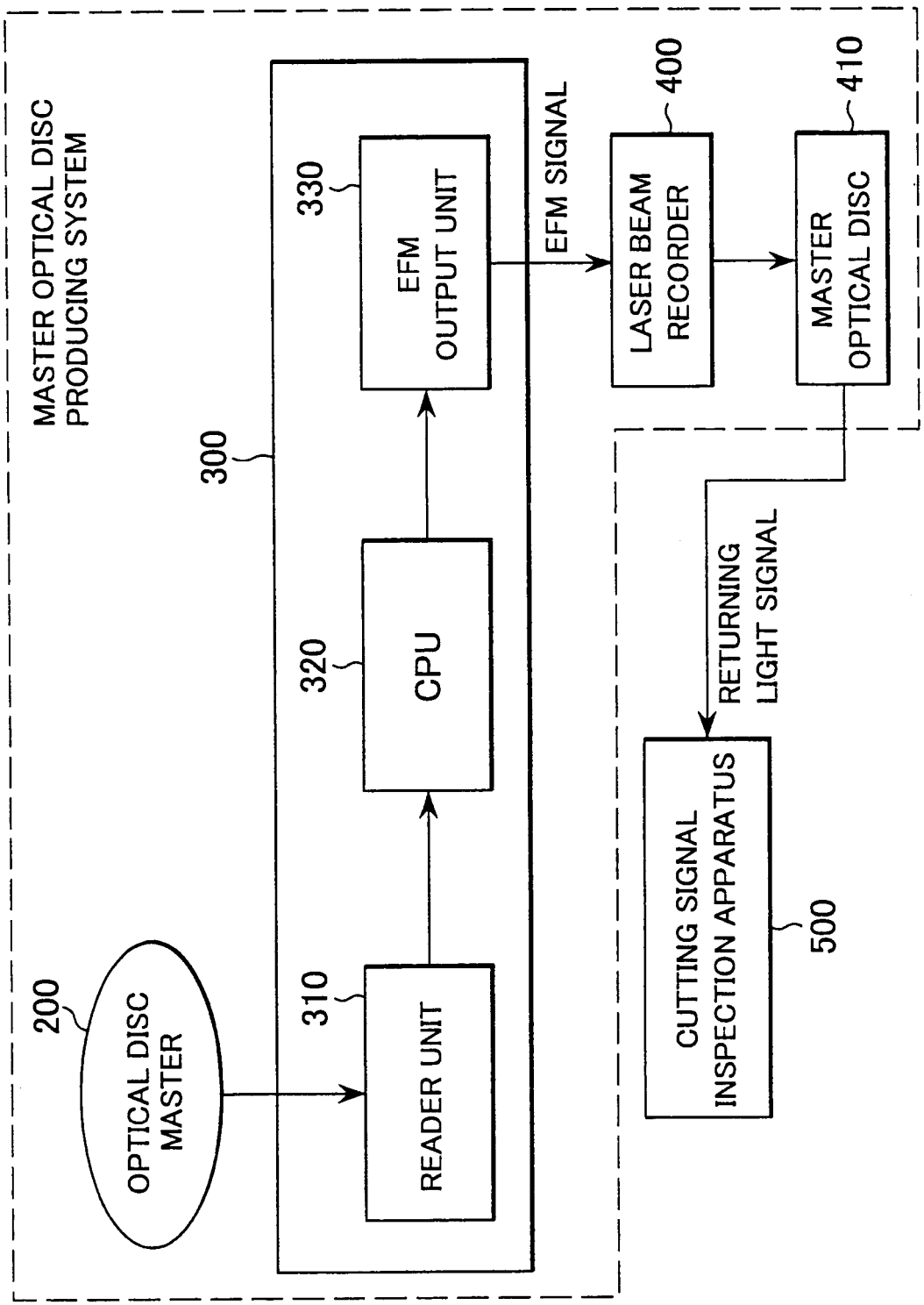
FIG. 6 is a structural view showing a configuration of a master optical disc producing system and a cutting signal inspection apparatus.

Now, the EFM signal and shape of pits formed on the optical disc according to the EFM signal will be explained. FIGS. 3–5 are examples of the EFM signals and pits to be formed. FIG. 3 is an usual EFM 3T signal and an usual EFM 3T pit formed by it. FIG. 4 is a case where the power of the LBR is changed to be a high-power. In this case, the level value of the EFM signal is set to be larger than a usual value so that the power of the LBR is made to be the high-power. According to this, the width of the pit is formed wider than a usual pit width. In this case, data compensation is carried out by making the signal length shorter than a usual signal length so that the player can correctly reproduce the data. FIG. 5 is a case where the power of the LBR is changed to be a low-power. In this case, the level value of the EFM signal is set to be smaller than a usual value so that the power of the LBR is made to be the low-power. Thus, the width of the pit in this case is formed narrower than an usual pit width. In this case, data compensation is carried out by making the signal length longer than a usual signal length so that the data is correctly reproduced by the player. In this way, the varied modulated signal does not synchronize with the channel clock.

On this account, in order to correctly demodulate the signal in the cutting signal inspection apparatus, it is required that the signal is shaped to be a signal substantially synchronized with the channel clock.

Now, FIG. 1 is again explained.

In the shaped signal pattern generation circuit 15, variation pattern information with regard to a variation pattern made on a returning light signal to be inputted is recorded in advance. In a case where the signal shaping circuit is mounted in the cutting signal inspection apparatus in a case of the master optical disc producing system, the returning light signal is supplied from the master optical disc cut in response to the varied modulated signal. The PLL 11 reproduces a clock from the inputted returning light signal, and it oscillates a channel clock and a clock of N times thereof. The channel clock is supplied to the shaped signal generation circuit 16, as well as being externally outputted. In addition, the clock of N times of the channel clock is supplied to the timing circuit 12. The timing circuit 12 generates a timing signal, which is necessary in each part of the signal shaping circuit, in accordance with the clock of N times of the channel clock inputted from the PLL 11, and supplies the timing signal to each part. The counter 13 receives the clock of N times of the channel clock signal from the timing circuit 12 as a timing signal and counts a length of the time interval between a signal level change and a next signal level change of the returning light signal as a signal length, and outputs the counted value to the shaped signal pattern generation circuit 15. On the other hand, the A/D conversion 14 receives the clock of N times of the channel clock from the timing circuit 12 as a timing signal, samples a change of the signal level of the returning light signal, and outputs the calculated level value to the shaped signal pattern generation circuit 15.

The shaped signal pattern generation circuit 15 predicts a variation value of the returning light signal from a count value and a level value of the inputted returning light signal using the variation pattern information. Then, the shaped signal pattern generation circuit 15 calculates an optimum shaped signal pattern to output it to the shaped signal generation circuit 16. In addition, the shaped signal pattern generation circuit 15 transfers the count value and the level value of the inputted returning light signal to the variation history recording circuit 17, at necessity. The shaped signal generation circuit 16 shapes the returning light signal in accordance with the shaped signal pattern outputted from the shaped signal pattern generation circuit 15, so as to output the shaped signal with reference to a channel clock. The shaped signal synchronizes with the channel clock and can be correctly demodulated. Furthermore, the variation history recording circuit 17 sequentially records the count values and the level values of the returning light signal inputted through the shaped signal pattern generation circuit 15 to generate a variation history.

In this way, since a signal capable of being correctly demodulated by converting a signal whose signal level and signal length are varied can be shaped, it becomes possible to deal with a varied signal by mounting the signal shaping circuit according to the present invention to an apparatus which does not support the varied signal. In addition, by changing the variation pattern recorded in the shaped signal pattern generation circuit 15 to coordinate with the input signal, it becomes possible to shape a signal capable of being demodulated in correspondence with a variety of varied signals. In particular, since a master optical disc producing system produces a wide variety of master optical discs, the signal shaping circuit of the present invention makes it easier for the cutting inspection apparatus or the like to cope with varied modulated signals. In addition, it is possible for the optical disc reproducing apparatus to easily cope with reproduction of varying modulated signals by utilizing the signal shaping circuit during reproducing optical discs.

Furthermore, recording the varied signal lengths and signal levels makes it possible to analyze the signals.

INDUSTRIAL APPLICABILITY

As described above, according to the signal shaping circuit of the present invention, variation pattern information with regard to a variation pattern to be applied on a modulated signal is recorded therein in advance. When the returning light signal corresponding to the varied modulated signal is inputted, the signal length and the signal level are detected, the variation value is predicted using the variation pattern information and the optimum shaped signal pattern is calculated. Based on the shaped signal pattern thus calculated, the returning light signal is converted and the optimum shaped signal is generated.

In this way, according to the present invention, since it is possible to obtain an optimum shaped signal by converting a varied modulated signal whose signal level and signal length are varied, no demodulation error occurs in subsequent demodulation steps. Therefore, it becomes possible for a device which does not support the varied signal to deal with the varied modulated signal having a predetermined variation pattern by mounting the signal shaping circuit of the present invention therein.

In addition, in the signal shaping method of a present invention, the variation pattern information with regard to the predetermined variation pattern to be applied to the modulated signal to be recorded on the optical disc is recorded, in advance. When the returning light signal corresponding to the varied modulated signal is inputted, the signal length and the signal level are detected, the variation value is predicted using the variation pattern information and the optimum shaped signal pattern is calculated. Subsequently, based on the calculated shaped signal pattern, the returning light signal is converted and the optimum shaped signal is generated.

In this way, according to the present invention, since it is possible to obtain an optimum shaped signal by converting a varied modulated signal whose signal level and signal length are varied, no demodulation error occurs in subsequent demodulation steps.

The invention claimed is:

1. A signal shaping circuit for receiving an input of a returning light signal from an optical disc or a master optical disc on which a varied modulated signal obtained by varying a modulated signal with a predetermined variation pattern is recorded and for converting the returning light signal so as to generate a shaped signal, said signal shaping circuit characterized by comprising:

signal length measurement means that measures a signal length of said returning light signal;

signal level measurement means that measures a signal level of said returning light signal;

shaped signal pattern generation means in which variation pattern information with regard to said predetermined variation pattern is stored therein in advance, which calculates and generates a shaped signal pattern from values of said signal length measured by said signal length measurement means and said signal level measured by said signal level measurement means and said variation pattern information; and shaped signal generation means that converts said returning light signal based on said shaped signal pattern generated by said shaped signal pattern generation means and generates the shaped signal.

2. The signal shaping circuit as claimed in claim 1, characterized by further comprising:

variation history recording means that records a history of variation in said signal length measured by the signal length measurement means and said signal level measured by the signal level measurement means.

3. The signal shaping circuit as claimed in claim 1, characterized in that:

said shaped signal pattern generation means has recorded therein compensation information of said modulated signal to be corrected in accordance with a variation pattern of said modulated signal as the variation pattern information in order to reduce a reproduction error during reproducing of said optical disc.

4. The signal shaping circuit as claimed in claim 1, characterized in that:

said optical disc has a region of a high reflection rate and a region of a low reflection rate formed on an information recording surface thereof caused by difference of pit width of a pit formed on said information recording surface, and has a visibly recognizable desired image recorded on said information recording surface; and said shaped signal pattern generation means records therein correction information of a signal level and a signal length required for recording said desired image as said variation pattern information.

5. The signal shaping circuit as claimed in claim 1, characterized in that:

said variation pattern information to be recorded in said shaped signal pattern generation means can be changed if necessary.

6. A signal shaping method for receiving an input of a returning light signal from an optical disc or a master optical disc on which a varied modulated signal obtained by varying a modulated signal with a predetermined variation pattern is recorded and for converting the returning light signal so as to generate a shaped signal, said signal shaping method characterized by comprising:

a recording step for recording in advance variation pattern information with regard to said predetermined variation pattern;

a signal length measurement step for measuring, as a signal length, a time interval between a signal level change and a next signal level change of said returning light signal inputted;

a signal level measurement step for measuring a signal level of said returning light signal;

a calculation step for calculating a shaped signal pattern corresponding to said signal length measured in a process of said signal length measuring step and said signal level measured in a process of said signal level measuring step based on said variation pattern information recorded in advance in a process of said recording step; and a generation step for generating a shaped signal by converting said returning light signal in accordance with said shaped signal pattern calculated in a process of said calculation step.

* * * * *